US008615515B2

(12) United States Patent
Lin et al.

(10) Patent No.: US 8,615,515 B2
(45) Date of Patent: Dec. 24, 2013

(54) SYSTEM AND METHOD FOR SOCIAL INFERENCE BASED ON DISTRIBUTED SOCIAL SENSOR SYSTEM

(75) Inventors: Ching-Yung Lin, Scarsdale, NY (US); Dmitry A. Rekesh, Castro Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 12/117,776

(22) Filed: May 9, 2008

(65) Prior Publication Data

US 2009/0282047 A1 Nov. 12, 2009

(51) Int. Cl.
*G06F 7/00* (2006.01)
*G06F 17/30* (2006.01)

(52) U.S. Cl.
USPC ............................ 707/736; 707/770; 707/785

(58) Field of Classification Search
USPC .......................................................... 707/736
See application file for complete search history.

(56) References Cited

U.S. PATENT DOCUMENTS 6,021,438 A * 2/2000 Duvvoori et al. ............. 709/224
6,115,709 A * 9/2000 Gilmour et al. ........................ 1/1
6,405,197 B2 * 6/2002 Gilmour ........................ 707/805
7,076,558 B1 * 7/2006 Dunn ............................ 709/229
2002/0053029 A1 * 5/2002 Nakamura et al. ............ 713/201
2002/0065891 A1 5/2002 Malik
2003/0097361 A1 * 5/2003 Huang et al. .................... 707/10
2003/0187775 A1 10/2003 Du et al.
2003/0208588 A1 * 11/2003 Segal ............................ 709/224
2004/0068477 A1 4/2004 Gilmour et al.
2004/0203589 A1 * 10/2004 Wang et al. ................... 455/410
2004/0221037 A1 * 11/2004 Costa-Requena et al. .... 709/225
2004/0254934 A1 * 12/2004 Ho et al. ........................... 707/9
2005/0065935 A1 * 3/2005 Chebolu et al. ................... 707/9
2005/0108257 A1 * 5/2005 Ishii et al. ...................... 707/100
2005/0132070 A1 * 6/2005 Redlich et al. ................ 709/228
2006/0200434 A1 * 9/2006 Flinn et al. ....................... 706/12
2006/0265328 A1 * 11/2006 Yasukura ........................ 705/44
2007/0192299 A1 * 8/2007 Zuckerberg et al. .............. 707/3
2007/0264974 A1 * 11/2007 Frank et al. .................... 455/411
2007/0287474 A1 * 12/2007 Jenkins et al. ............. 455/456.2
2008/0005325 A1 * 1/2008 Wynn et al. ................... 709/225
2008/0108308 A1 * 5/2008 Ullah ........................... 455/41.2
2008/0222734 A1 * 9/2008 Redlich et al. .................. 726/26
2009/0187537 A1 * 7/2009 Yachin et al. ...................... 707/3
2009/0254624 A1 * 10/2009 Baudin et al. ................. 709/206
2009/0265319 A1 * 10/2009 Lehrman et al. .................. 707/3
2009/0287935 A1 * 11/2009 Aull et al. ..................... 713/182

OTHER PUBLICATIONS

United States Office Action dated Apr. 1, 2013 in U.S. Appl. No. 13/416,320.

* cited by examiner

*Primary Examiner* — Binh V Ho
(74) *Attorney, Agent, or Firm* — William J. Stock, Esq; McGinn IP Law Group, PLLC

(57) ABSTRACT

A method (and system) for data acquisition includes extracting information from user communications and allowing a user to control the information to be extracted. The method of data acquisition may include downloading a user's sent materials from a communication data repository, analyzing the downloaded materials and extracting data portions that are authored by the user, generating statistical values from the extracted data, transmitting the generated statistical values to one or multiple repositories, receiving generated statistical values one or multiple server machines, and aggregating statistical values of multiple users.

8 Claims, 5 Drawing Sheets

SYSTEM AND METHOD FOR SOCIAL INFERENCE BASED ON DISTRIBUTED SOCIAL SENSOR SYSTEM

BACKGROUND OF THE INVENTION

1. Field of the Invention

The present invention relates to a method of data acquisition, and more particularly to a method (and system) of acquiring information from user communications while allowing the user to control the information acquired.

2. Background Description

Data acquisition is a very challenging problem to social software. It is, in general, difficult to acquire valuable information. For instance, on average, an employee spends 40% of their time writing emails and instant messaging during work. The information in the e-mails and instant messages is valuable data, which can be used to infer an employee's knowledge.

In order to acquire useful communication information, previous systems work on acquiring data through a corporate e-mail server or an instant message server. Such data acquisition is typically conducted without the users' knowledge. Thus, the acquisition introduces various security and privacy concerns from users and becomes a major reason that hinders the use of valuable communication data for corporate use.

SUMMARY OF THE INVENTION

In view of the foregoing and other exemplary problems, drawbacks, and disadvantages of the conventional methods and structures, an exemplary feature of the present invention is to provide a method and structure that can acquire data from a user's communications without affecting the privacy of the user.

In accordance with a first exemplary aspect of the present invention, a method of data acquisition includes extracting information from user communications and allowing a user to control the information to be extracted.

In accordance with a second exemplary aspect of the present invention, a method of data acquisition includes downloading a user's sent materials from a communication data repository, analyzing the downloaded materials and extracting data portions that are authored by the user, generating statistical values from the explicitly extracted data, transmitting the generated statistical values to one or multiple repositories, receiving generated statistical values on one or more multiple server machines, and aggregating statistical values of multiple users.

In accordance with a third exemplary aspect of the present invention, a distributed social sensor system implemented method of social network inference or expertise location includes installing a software program residing on an individual user's machine for downloading the user's own sent materials from a communication data repository, analyzing the downloaded materials and extracting the data portions that are explicitly authored by the user, generating statistical values from the explicitly extracted data, transmitting the generated statistical values to one or multiple social sensor server repositories, installing a software program residing on one or multiple social sensor server repository machines to receive generated statistical values of multiple users, and aggregating statistical values of multiple users to construct one or plural aggregated social networks, expertise inference, or social networks and expertise inference of multiple persons including only users or both users and non-users.

The present invention provides an asset of network client software that resides in an end user's machine. In accordance with certain aspects of the invention, the present invention uses an algorithm process to extract features from communications. Data is transferred into a hub repository using client-server web architecture. The present invention also provides a mechanism to run these processes periodically without user intervention. Furthermore, an exemplary aspect of the present invention allows a user to control the information to be captured.

In accordance with an exemplary aspect, the present invention may infer social network or expertise data from communication. Acquisition of communication data, however, is extremely difficult, because of privacy concerns. Seldom do users want to reveal their communications to other people or allow a machine residing somewhere in the computer network to capture their communication data because of a potential privacy leakage.

Therefore, in accordance with an exemplary aspect, the present invention takes privacy-preservation and copyright-preservation into account for data acquisition. The present invention avoids capturing raw communication data by only taking the statistics of communication data that are explicitly authored by the user. Furthermore, the present invention provides a mechanism that allows a user to monitor acquired information and prevent certain information from being acquired. Additionally, the user is able to modify the inference result, before their inferred expertise or personal social network is aggregated into large repositories to be used for public application.

Accordingly, the present invention significantly increases the confidence level of users and makes them more willing to provide data without compromising their privacy. This invention fosters a foundation of large-scale social network and expertise inference applications.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF EXEMPLARY EMBODIMENTS OF THE INVENTION

Figure 1:
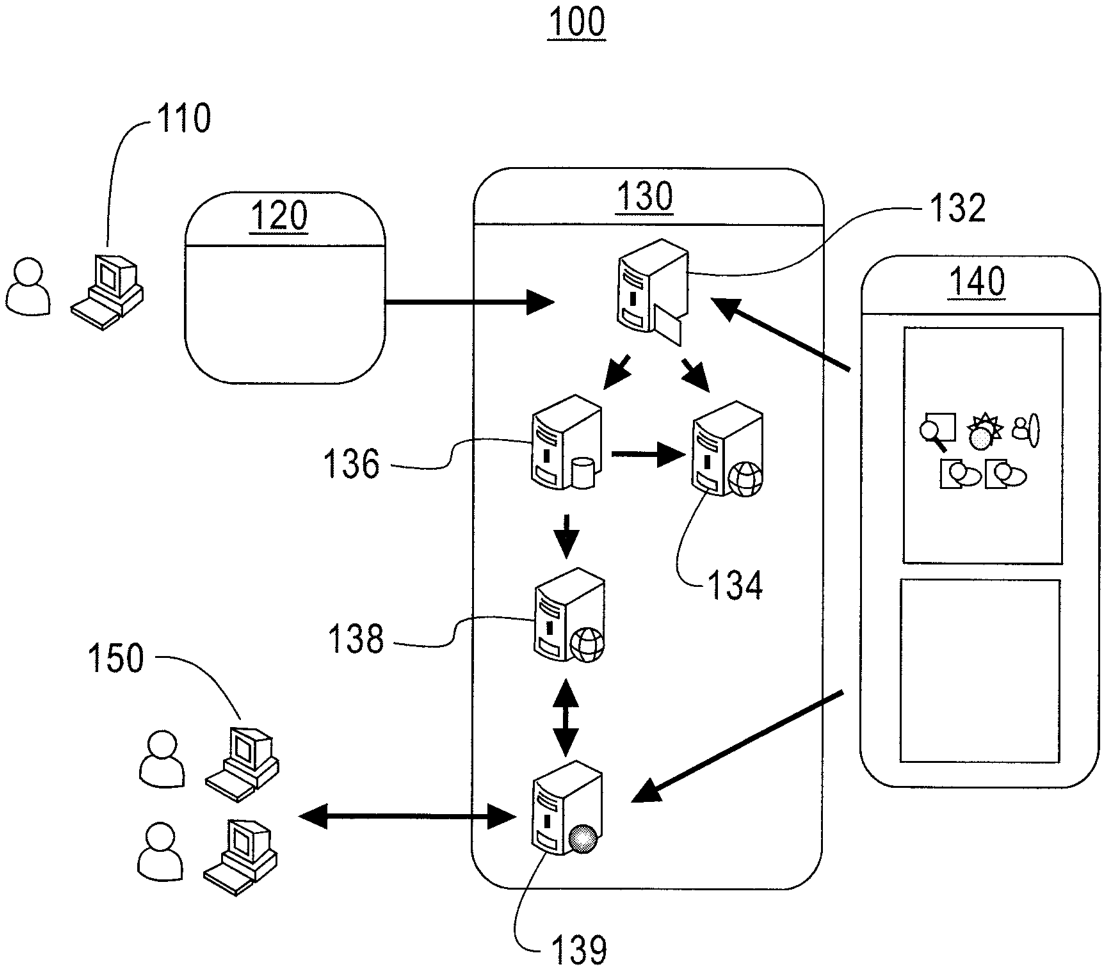
FIG. 1 is a simplified conceptual system diagram for multimodality expertise and social network inference in accordance with certain exemplary embodiments of the present invention.

Referring now to the drawings, and more particularly to FIGS. 1-7, there are shown exemplary embodiments of the method and structures according to the present invention.

Certain exemplary, non-limiting embodiments of the present invention are directed to a social sensor system (and method) that deploys social sensors in an employee's computer to gather features of the employee's communications. Because only features, not entire communications, are captured, users are more willing to contribute to the system, because the user's privacy will be maintained. In addition, the system allows users to set stop-words to exclude specific words from being captured. The system may also run periodically and automatically without any user intervention. Thus, this system can be used to capture valuable information that is appropriate for social inference in social software applications.

Most prior expertise locator systems acquire data by having individuals fill out profile information or by extracting the information or deriving artificial intelligence talgorithms from existing sources. Those sources could be "public" such as co-authored documents, patents or user-generated from blogs, wikis and social tagging systems. Data can also be acquired from private sources such as e-mail, chat, and calendar entries that contribute semantic information as well as social network data.

Private data, such as, but not limited to, e-mail logs, have the advantage of containing rich information from which information about what one knows and whom one knows can be derived. These data also address issues of (a) coverage—everyone uses email so data can be collected from everyone not just the people who have authored documents or other data; (b) maintainability—new email is constantly being generated; and (c) ease of use—people are already using email so other than asking users for permission to use their data there is no additional work required by the user.

Using private data, however, may violate a user's (or other party's) privacy. If privacy issues are not adequately addressed, users will quickly stop using an expertise locator system, opt out of volunteering their data, and generate negative word of mouth, all of which would severely affect any ability to have sufficient people in the system to deliver useful search results.

In accordance with an exemplary, non-limiting aspect of the present invention, the system uses e-mails and instant messaging as a data source to obtain appropriate information while maintaining the users' privacy. Additionally, public data from profile, blogs, forum, social bookmarking, etc., may be used to help enhance the expertise ranking accuracy.

In an exemplary embodiment of the present invention, the system (and method) may utilize a plurality (e.g., three) of data sources, including but not limited to, an employee's outgoing emails to other employees within the company, outgoing stored chats, and profile data from an enterprise directory. These data are contributed to a wider aggregated data pool. The system applies artificial intelligence algorithms to infer a participant's social network (who they know) and the expertise of those people (what they know) based on these communications (e.g., outgoing communications). The modified social networks (and the related expertise data) are aggregated to form a composite data pool.

Because of the sensitivity of the data, the present invention provides strict guidelines that restrict the data that may be collected, how the data is used, and what information is available to users. In particular, the present invention uses aggregated and inferred information, which prevents any user from seeing a direct relationship between any person in the system, their email, and the information being displayed. The system does not keep or display any information about whom a user communicated with and about what the user communicated.

The system merely collects data from people who opt into the system. Once a user enters the system of the present invention, the user merely specifies a location of his/her e-mail archives and/or chat history. The system then extracts data from the e-mail archives and/or chat history. The real e-mail or chat data never leaves the users' machines. Only statistical indexes are transmitted.

Furthermore, in accordance with an exemplary non-limiting aspect of the present invention, the system extracts content from outgoing e-mail. That is, the system extracts content from e-mails that were authored by the person who opted into the system. The system may be configured to extract content from only outgoing e-mails authored by the user. The system, however, is not limited to merely extracting information outgoing e-mails and may be used to extract information from any communication involving the user.

Additionally, the system may be configured to exclude threads that are embedded in the e-mail. The system may also be configured to exclude any e-mails marked private or confidential.

The system, as provided in several non-limiting embodiments of the present invention, is open for expertise and social network on all employees of a company by applying a collaborative filtering/link analysis algorithm, which makes unbiased, intelligent inferences among a large number of people based on only data contributed by a small number of people.

To increase the privacy of contributing users and non-contributing parties further, the system of the present invention may inform a non-contributing party that the party may be found through the system whenever a user's data can start making meaningful inferences on the party's expertise and social network. Additionally, the system allows any user (either a data contributor or a non-contributor), at any time, to limit the search items that cannot be found or the people they cannot be associated with.

FIG. 1 illustrates an application scenario, in accordance with an exemplary, non-limiting embodiment of the present invention, in which each of a plurality of contributing users 110 installs a social sensor in their machine and contributes their own authored data to the system 100. The system client component 120 captures a user's (or users') outgoing communications in real time or from saved archives. For instance, the system client component 120 may include a mail collector (e.g., Lotus Mail Collector), an instant message collector (e.g., Lotus Sametime Collector), and/or other data collectors (e.g., a collector plug-in). The user(s) can set up a personal privacy policy to control the types of data that can be extracted and manipulate the inference result in the server. After analysis, data is sent to the upload server 132 in the system server component 130. Another set of public data 140 can be imported into the system 100. Examples of this data include profiles, blogs, social bookmarks, communities, and activities as in Lotus Connections or news from discussion board messages. In the server 130, there are five components that handle data upload, data storage, data indexing, search engine, and web servers. The upload server 132 receives relevant data and stores the data in a data repository 136. The index engine 134 aggregates multiple users' data in order to infer the expertise and social network of users and non-users. Any authorized user 150 can then use the applications provided by the server 130. The server 130 can also collect users' data from public data sources 140, such as forum, blogs, etc. or from other application databases, e.g., Lotus Connections. The search engine 138 provides search services that can be based on keywords, phrases, names, etc. The web server 139 renders webpages based on search results and/or retrieved public information of individual(s). Then, the generated webpages are returned to the authorized users 150.

Figure 2:
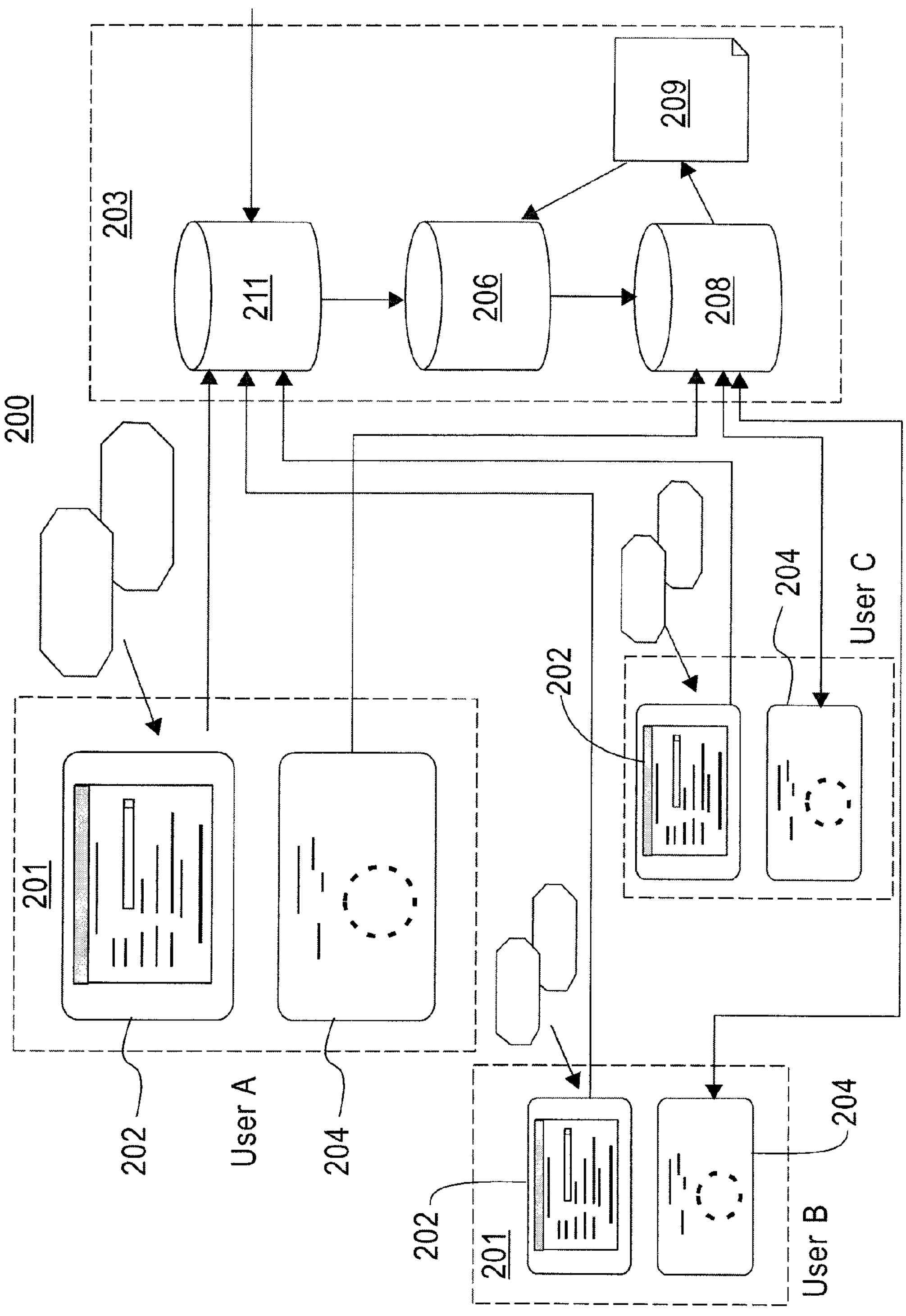
FIG. 2 is a block diagram of a social sensor system in accordance with certain exemplary embodiments of the present invention.

FIG. 2 illustrates an example of social sensor data collection, in accordance with an exemplary, non-limiting embodiment of the present invention. Users 201 run a social sensor 202 at their machines, either with a user interface or periodically running in background. Multiple users send their data to the social sensor server 203 for data aggregation. Each individual's data is sent to an inference engine 204 to infer the users' personal social network. Non-users' personal social network can also be inferred by using users' data. The data is sent to the web server 208 to provide personal social network 204 visualization to the user. Users can set up permanent profile management, using a permanent profile manager 209, which allows the users to exclude or include specific people or exclude specific words being associated to the user himself/herself.

Figure 3:
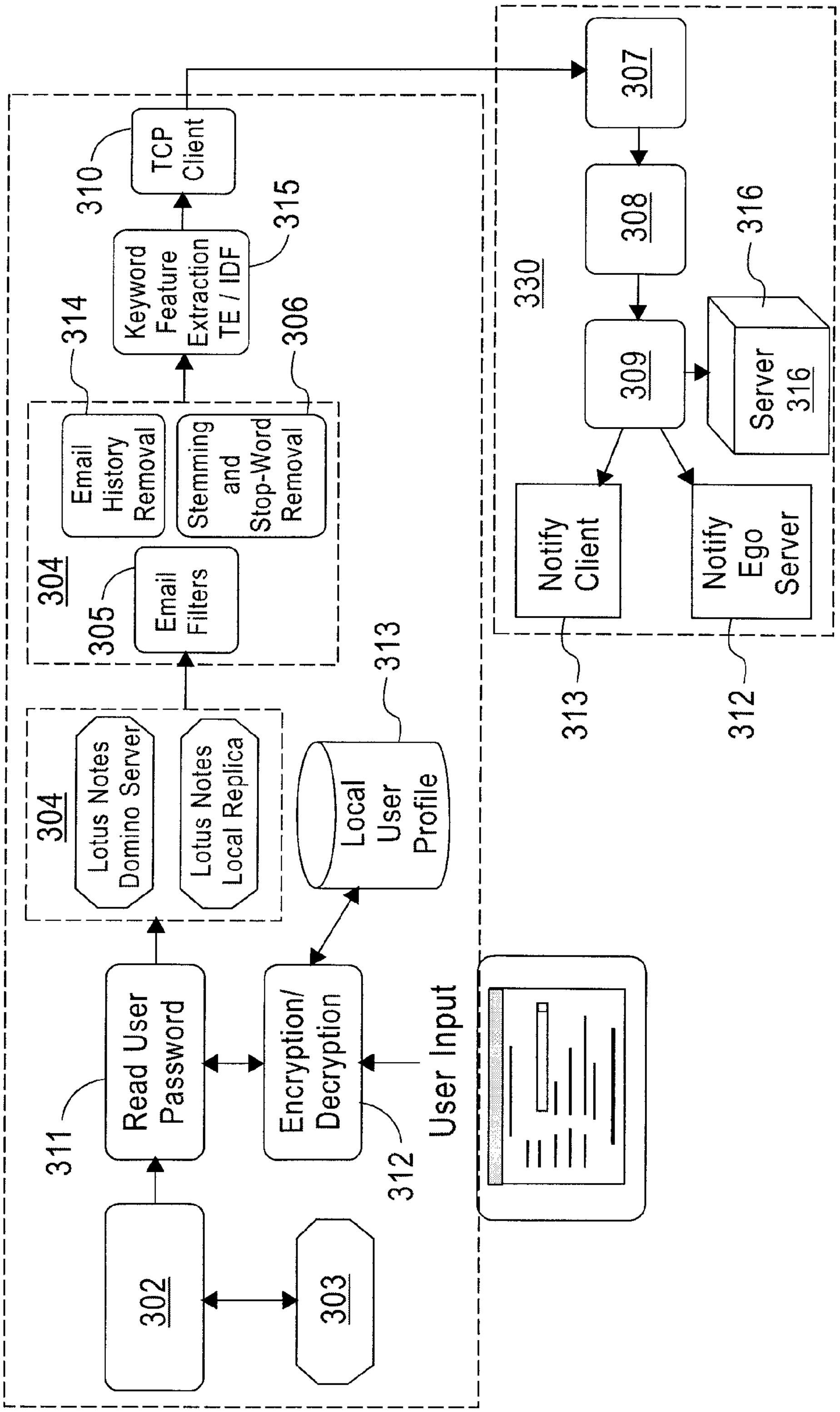
FIG. 3 is a block diagram of the social sensors that undergoes data capturing, stop-word removable, stemming, and statistic calculation in accordance with certain exemplary embodiments of the present invention.

FIG. 3 illustrates an example of the operation of the social sensor 202 and client server 211 as in FIG. 2. A sensor 302 reads data from a mail server 304 (e.g., Lotus Notes Domino server, Lotus Notes Local Replica, or Microsoft Exchange Server). The social sensor 202 then filters 305 out only the sent emails or chats and filters out only the portion that is written by the user. The social sensor can also read a personalized privacy policy to exclude specific communications from being captured. Next, the sensor can, but not necessarily, execute stemming and stop word removal 306, which helps to generate basic forms of a word, words or phrases. Then, some statistics of the basic forms are calculated. These statistics are sent to a remote server 330. Transmission can be through TCP communication 310, with or without encryption. The sensor server 330 has the TCP server 307 to receive uploading from multiple social sensors. When new data is received, the TCP server 307 conducts format conversion 308 to convert the data from various sources into specific types of common format. Then, the TCP server 307 can capture some other public data 309 (e.g., Bluepage which is a kind of personal profile database) to obtain other information about a person. After this step, the TCP sever 307 executes the inference engine and can notify users 313 that their data have been successfully updated.

Email history removal 314 removes the historical thread in an email. The purpose is to remove any portion in an email that is not written by the email sender.

The email/IM filters 305 are used to exclude emails that have specific characteristics as defined in the metadata of email (e.g., subject line, sender, cc, time, etc.). The purpose is to exclude emails that are configured as not to be proceeds. For example, the system uses only the emails authored by the user, exclude emails with subject lines with specific words (e.g., confidential, attorney, personal, private, etc.), uses only the emails sent receivers within a range (e.g., only those emails to inside the company, inside the business division, inside a country, etc.).

The stemming and stop-word removal 307 processes a text analysis scheme, which removes stop-words in sentences and converts all words to stems (e.g., convert "file", "files", "filed", or "filing", to "file").

The keyword extraction TF/IDF 315 calculates statistics of stemmed word term frequencies (TF) in each individual email. The inverse document frequency (IDF) is an optional statistic than can be extracted. The boxes described in this figure can apply to not only emails, but also instant messages or calendar data.

Figure 4:
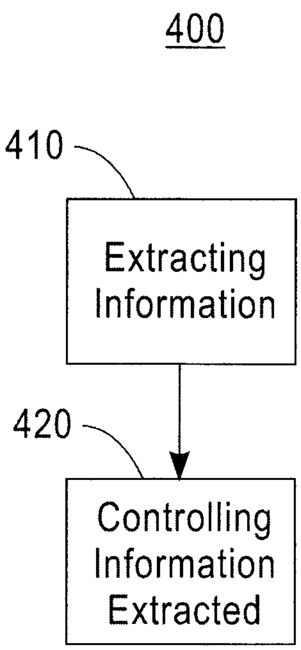
FIG. 4 is a block diagram illustrating a method 400 of data acquisition in accordance with an exemplary, non-limiting embodiment of the present invention.

FIG. 4 illustrates a method 400 of data acquisition in accordance with certain exemplary, non-limiting embodiments of the present invention.

The method 400 of data acquisition includes extracting information from user communications 410 and allowing a user to control the information to be extracted 420. Specifically, the method includes extracting information from, for example and not limited to, outgoing user communications. More specifically, the method includes extracting information from, for example and not limited to, communications that are authored by the contributing user. The controlling method may include, for example but not limited to, excluding some communications based on a user-specified exclude list, which includes a list of words or topics to be excluded. The controlling method may also include, for example but not limited to, excluding some communications based on a user-specified exclude list of communicating people.

Figure 5:
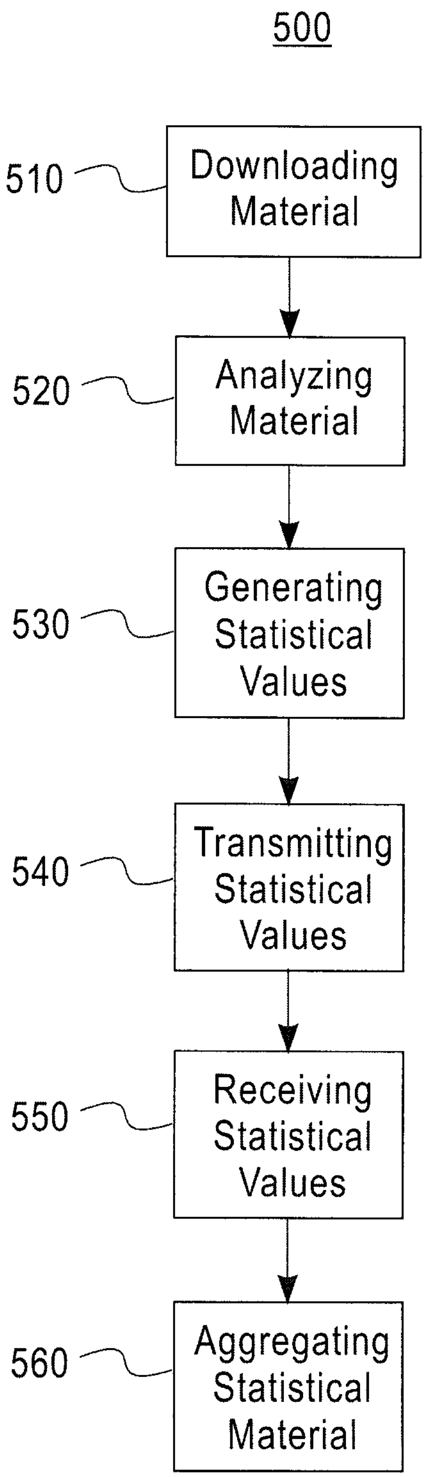
FIG. 5 is a block diagram illustrating a method 500 of data acquisition in accordance with an exemplary, non-limiting embodiment of the present invention.

FIG. 5 illustrates another method 500 of data acquisition in accordance with certain exemplary, non-limiting embodiments of the present invention.

The method 500 of data acquisition, may include downloading 510 a user's materials (e.g., sent materials) from a communication data repository, analyzing 520 the downloaded materials and extracting data portions (e.g., data portions that are authored by the user), generating 530 statistical values from the extracted data, transmitting 540 the generated statistical values to one or multiple repositories (e.g., social sensor server repositories), receiving 550 the generated statistical values on one or multiple server machines (e.g., social sensor server repository machines), and aggregating 560 statistical values of multiple users.

The aggregated statistical values may then be used to construct one or plural aggregated social networks, expertise inference, or social networks and expertise inference of multiple people including only users or both users and non-users. The method 500 (and system) values may include, for example but not limited to, a set of user interfaces to allow a user to manually add or remove a person(s) from the user's personal social network before or after aggregation. Furthermore, the method may include, for example but not limited to, a set of user interfaces to allow a user to manually remove the user from a set of expertise words before or after aggregation.

In certain exemplary aspects of the present invention, the above-described methods may be implemented in a distributed social sensor system for social network inference or expertise location, as described above and exemplarily illustrated in FIGS. 1-3.

Furthermore, the above methods may also include installing a software program residing on an individual user's machine for downloading the user's own sent materials from a communication data repository and installing a software program residing on one or multiple social sensor server repository machines to receive generated statistical values of multiple users.

Figure 6:
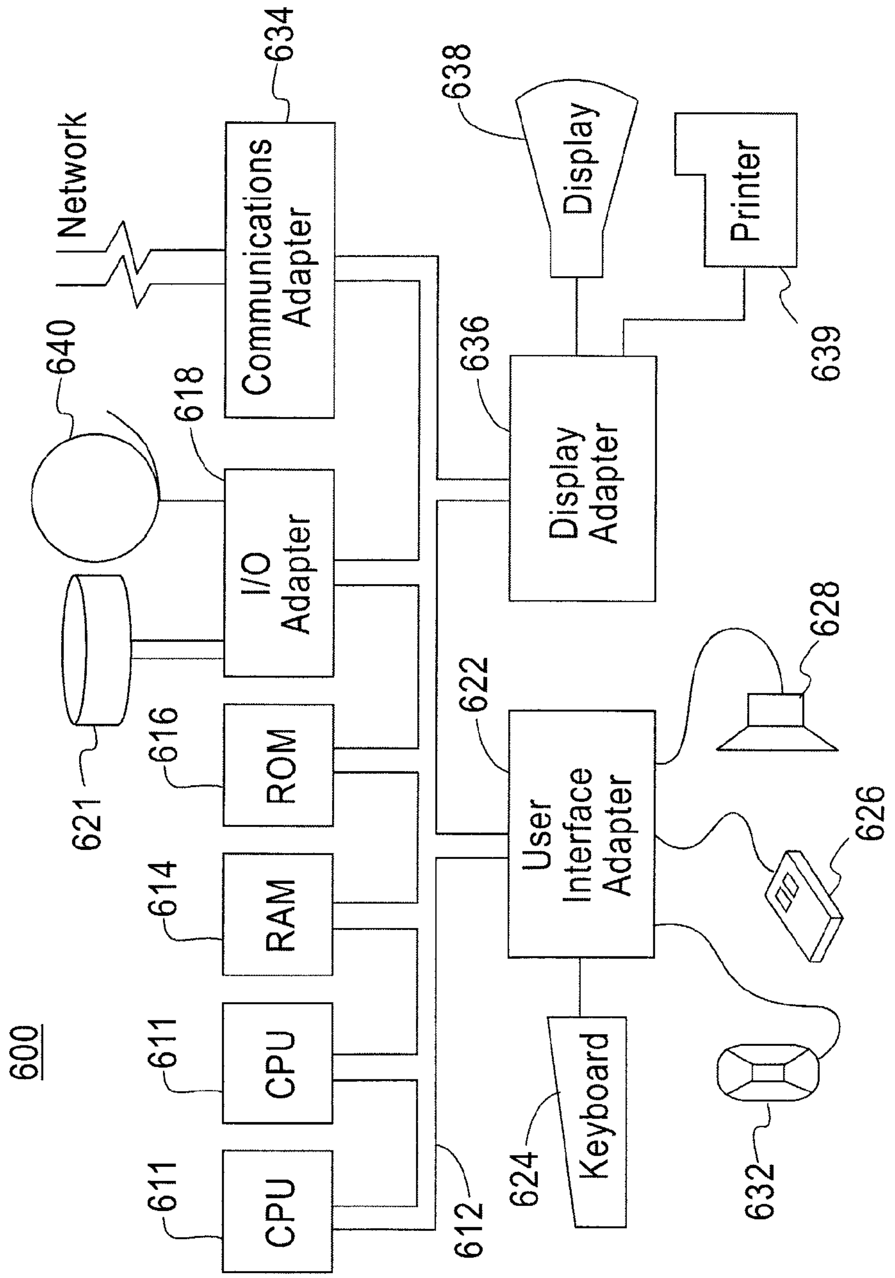
FIG. 6 illustrates an exemplary hardware/information handling system 600 for incorporating the present invention therein.
Figure 7:
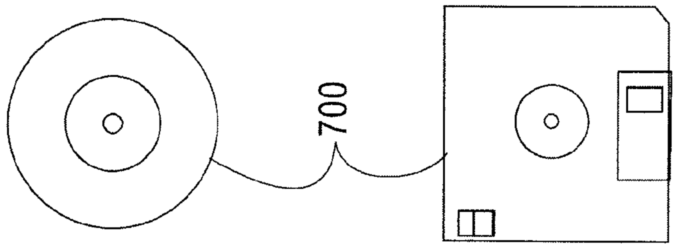
FIG. 7 illustrates a computer-readable medium 700 (e.g., storage medium) for storing steps of a program of a method according to the present invention.

FIG. 6 illustrates a typical hardware configuration of an information handling/computer system in accordance with the invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable (computer-readable) instructions. These instructions may reside in various types of signal-bearing or computer-readable media.

Thus, this aspect of the present invention is directed to a programmed product, comprising signal-bearing media or computer-readable media tangibly embodying a program of machine-readable (computer-readable) instructions executable by a digital data processor incorporating the CPU 611 and hardware above, to perform the method of the invention.

This computer-readable media may include, for example, a RAM contained within the CPU 611, as represented by the fast-access storage for example. Alternatively, the instructions may be contained in another computer-readable media, such as a magnetic data storage diskette 700 (FIG. 7), directly or indirectly accessible by the CPU 611.

Whether contained in the diskette 700, the computer/CPU 611, or elsewhere, the instructions may be stored on a variety of computer-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media. In accordance with certain exemplary embodiments of the present invention, the computer-readable media may include transmission media such as digital and analog and communication links and wireless. In an illustrative embodiment of the invention, the machine-readable (computer-readable) instructions may comprise software object code.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of data acquisition, comprising:

extracting information from outgoing, user-authored communications, said extracting comprising extracting information only from communications authored by users who have provided authorization for system access to the communications;

allowing a user, the user having authored the user-authored communications, to control the information to be extracted, comprising controlling an exclude list, said exclude list comprising types of communications that are not allowed to be extracted;

inferring, based on the extracted data, a personal network for the user, said inferring comprising avoiding a direct relationship between any person in the system, their email, and the information being displayed; and allowing the user to manipulate the personal network.

2. The method according to claim 1, wherein said user-authored communications comprise user authored e-mails and user authored instant messages.

3. The method according to claim 1, further comprising extracting information about the user from public information sources.

4. The method according to claim 3, wherein said public information sources comprise at least one of user authored blogs, user authored communications in a forum, and a user profile in an enterprise directory.

5. The method according to claim 1, further comprising removing stop-words, said stop-words being set by the user to exclude certain words from being captured.

6. The method according to claim 1, further comprising removing historical threads from email not written by the user.

7. The method according to claim 1, wherein said exclude list includes a list of user-specified words or topics to be excluded.

8. The method according to claim 1, wherein said exclude list includes a list of user-specified exclude list of people with whom communications are to be excluded.

* * * * *